US012678828B2

(12) United States Patent
Gwak

(10) Patent No.: US 12,678,828 B2
(45) Date of Patent: Jul. 14, 2026

(54) DEVICE AND METHOD FOR CLASSIFYING FRUITS

(71) Applicant: AIO Farm Corp., Seongnam-si (KR)

(72) Inventor: Hojae Gwak, Seongnam-si (KR)

(73) Assignee: AIO Farm Corp., Seongnam-si (KR)

( * ) Notice: Subject to any disclaimer, the term of this patent is extended or adjusted under 35 U.S.C. 154(b) by 393 days.

(21) Appl. No.: 18/351,165

(22) Filed: Jul. 12, 2023

(65) Prior Publication Data

US 2024/0131558 A1 Apr. 25, 2024

Related U.S. Application Data

(63) Continuation of application No. PCT/KR2022/000645, filed on Jan. 13, 2022.

(30) Foreign Application Priority Data

Jan. 15, 2021 (KR) ........................ 10-2021-0005676

(51) Int. Cl.
*B07C 5/342* (2006.01)
*B07C 5/16* (2006.01)

(52) U.S. Cl.
CPC .............. *B07C 5/3422* (2013.01); *B07C 5/16* (2013.01); *B07C 2501/009* (2013.01)

(58) Field of Classification Search
CPC .................................................... B70C 5/3422
USPC .................. 700/213; 209/552, 592, 645, 659
See application file for complete search history.

(56) References Cited

U.S. PATENT DOCUMENTS

| | | | | |
|---|---|---|---|---|
| 4,735,323 A * | 4/1988 | Okada | B07C 5/365 209/555 |
| 6,271,520 B1 * | 8/2001 | Tao | G01N 21/3563 250/910 |
| 6,610,953 B1 * | 8/2003 | Tao | G01N 21/3563 209/11 |
| 7,121,399 B2 * | 10/2006 | Mills | B07C 5/363 209/932 |
| 9,919,345 B1 * | 3/2018 | Lu | B07C 5/36 |
| 10,249,054 B2 | 4/2019 | Amat Roldan et al. | |
| 10,757,861 B2 * | 9/2020 | Robertson | G06Q 30/0283 |
| 10,877,015 B2 * | 12/2020 | Liu | G01N 25/72 |
| 11,003,958 B2 * | 5/2021 | Dasari | G06T 7/0004 |
| 11,132,726 B2 * | 9/2021 | Farmer | G06Q 10/06 |

(Continued)

FOREIGN PATENT DOCUMENTS

| | | |
|---|---|---|
| JP | 2020-148620 A | 9/2020 |
| KR | 10-2017-0056716 A | 5/2017 |

(Continued)

OTHER PUBLICATIONS

International Search Report issued in PCT/KR2022/000645; mailed Apr. 5, 2022.

(Continued)

*Primary Examiner* — Khoi H Tran
(74) *Attorney, Agent, or Firm* — Studebaker Brackett PLLC

(57) ABSTRACT

Disclosed is a device and method for identifying fruits that sorts fruits by sequentially sorting a plurality of fruits which are input, generating image data, determining the grade of each fruit based on the weight of the fruit, and determining a defective state or a normal state by using a defect feature certainty.

12 Claims, 9 Drawing Sheets

(56) References Cited

U.S. PATENT DOCUMENTS

| | | | | |
|---|---|---|---|---|
| 11,900,642 | B2 * | 2/2024 | Nomura | G06T 7/0012 |
| 2013/0146509 | A1 * | 6/2013 | Soler Esteban | B07C 5/342<br>209/552 |
| 2017/0124727 | A1 | 5/2017 | Amat Roldan et al. | |

FOREIGN PATENT DOCUMENTS

| | | | |
|---|---|---|---|
| KR | 10-1839548 | B1 | 3/2018 |
| KR | 10-2020-0126849 | A | 11/2020 |
| KR | 10-2285603 | B1 | 8/2021 |
| WO | 2015/193711 | A1 | 12/2015 |

OTHER PUBLICATIONS

A Notice of Office Action mailed by the Korean Intellectual Property Office on Jul. 17, 2022, which corresponds to Korean Patent Application No. 10-2021-0099577 with English language translation.

Jeong, Soo-Ho et al.; "A Study on Deep Learning based Apple Quality Classification System"; The Graduate School of Sunchon National University; 2019; Total 44 Pages.

Koo, Min-jeong et al.; "A fruite grader system base on Digital image"; Papers presented at the 38th Summer Conference of the Korea Computer Information Society; vol. 16, Issue 1; 2008; pp. 237-241.

"Why do we use 'e' in the softmax function?"; online, Posted by Max Level Developer; Oct. 2019, retrieved Jul. 14, 2022; Total 3 Pages; URL:https://lv99.tistory.com/7.

* cited by examiner

DEVICE AND METHOD FOR CLASSIFYING FRUITS

CROSS-REFERENCE TO RELATED APPLICATIONS

The present application is a continuation of International Patent Application No. PCT/KR2022/000645, filed on Jan. 13, 2022, which is based upon and claims the benefit of priority to Korean Patent Application No. 10-2021-0005676 filed on Jan. 15, 2021. The disclosures of the above-listed applications are hereby incorporated by reference herein in their entirety.

BACKGROUND

Embodiments of the inventive concept described herein relate to a fruit, and more particularly, relate to a device and method for identifying fruits.

In general, workers visually check a state of each fruit and determine the grade for a fruit. In particular, the grade of a fruit is usually determined based on the weight of the fruit. However, defective conditions such as cuts, bruises, spoilage, and pest infestation of the fruit need to be visually determined by the workers.

As such, because the workers need to directly determine defective conditions of the fruit, a lot of manpower and costs have been consumed to identify fruits, thereby reducing the efficiency of agriculture and forestry. Moreover, when the worker does not have expertise in fruit identification, accuracy and consistency in fruit identification may be reduced because the workers incorrectly grade fruits.

Accordingly, the need for a plan for solving these problems has emerged.

SUMMARY

Embodiments of the inventive concept provide a device and method for identifying fruits while minimizing manpower and cost.

Embodiments of the inventive concept provide a device and method for identifying fruits with accuracy and consistency.

According to an embodiment, a fruit identification device includes a fruit inserting unit that aligns a plurality of fruits in a row and rotates the aligned fruits, a fruit sorting unit that sequentially classifies the aligned fruits under control of a control unit, an image acquisition unit that generates pieces of image data for one fruit by sequentially capturing the rotated fruits, and the control unit that generates pieces of fruit image data by extracting only a fruit from the pieces of image data, determines a weight of the fruit by using the pieces of fruit image data, determines a grade of the fruit by using the weight of the fruit, determines a plurality of defect feature certainties by processing the pieces of image data, compares the defect feature certainties with a predetermined reference defect feature certainty, determines that the fruit is in a defective state or a normal state, based on the comparison result, moves the fruit to a defective region through the fruit sorting unit when the fruit is in the defective state, and moves the fruit to a normal region corresponding to the grade of the fruit among a plurality of normal regions through the fruit sorting unit when the fruit is in the normal state.

According to an embodiment, a method for identifying a fruit includes aligning, by control unit, a plurality of fruits in a row and rotating the aligned fruits, through a fruit inserting unit, generating, by the control unit, pieces of image data for one fruit by sequentially capturing the rotated fruits through an image acquisition unit, generating, by the control unit, pieces of fruit image data by extracting only a fruit from the pieces of image data, determining, by the control unit, a weight of the fruit by using the pieces of fruit image data and determining a grade of the fruit by using the weight of the fruit, determining, by the control unit, a plurality of defect feature certainties by processing the pieces of image data and comparing the defect feature certainties with a predetermined reference defect feature certainty, determining, by the control unit, that the fruit is in a defective state or a normal state, based on the comparison result, moving, by the control unit, the fruit to a defective region through the fruit sorting unit when the fruit is in the defective state, and moving, by the control unit, the fruit to a normal region corresponding to the grade of the fruit among a plurality of normal regions through the fruit sorting unit when the fruit is in the normal state.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
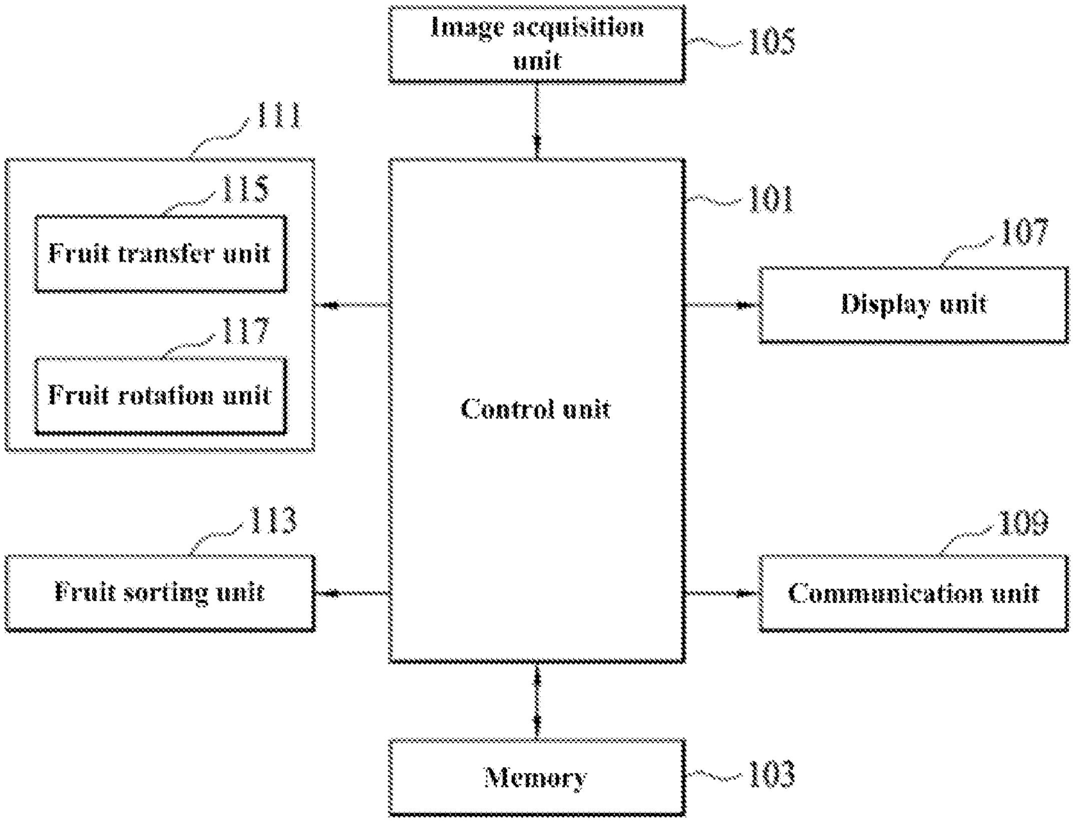
FIG. 1 is a block diagram of a fruit identification device, according to an embodiment of the inventive concept.

Terms used in this specification will be briefly described, and the inventive concept will be described in detail.

Although certain general terms widely used at present are selected to describe embodiments in consideration of the functions of the inventive concept, these general terms may vary according to intentions of one of ordinary skill in the art, case precedents, the advent of new technologies, and the like. Terms arbitrarily selected by the applicant of the embodiments may also be used in a specific case. In this case, their meanings are given in the detailed description of the inventive concept. Hence, these terms used in the inventive concept may be defined based on their meanings and the contents of the inventive concept, not by simply stating the terms.

While an embodiment of the inventive concept is susceptible to various modifications and alternative forms, specific embodiments thereof are shown by way of example in the drawings and will herein be described in detail. It should be understood, however, that there is no intent to limit a scope to the particular forms disclosed, but on the contrary, the inventive concept is to cover all modifications, equivalents, and alternatives falling within the spirit and scope of the inventive concept. In the description of embodiments, when it is determined that the detailed description of the related well-known technology may obscure the gist, the detailed description thereof will be omitted.

Although the terms "first", "second", etc. may be used to describe various components, the components should not be construed as being limited by the terms. Terms are only used to distinguish one component from another component.

The articles "a," "an," and "the" are singular in that they have a single referent, but the use of the singular form in the specification should not preclude the presence of more than one referent. In this application, it should be understood that the terms "include" or "consist of", when used herein, specify the presence of stated features, integers, steps, operations, components, and/or parts, but do not preclude the presence or addition of one or more other features, integers, steps, operations, components, parts, and/or groups thereof.

In an embodiment of the inventive concept, a 'module' or 'unit' may perform at least one function or operation, and may be implemented in hardware or software or a combination of hardware and software. Moreover, a plurality of 'modules' or a plurality of 'units' may be integrated into at least one module and implemented by at least one processor (not shown), except for 'modules' or 'units' that need to be implemented with specific hardware.

In an embodiment of the inventive concept, when it is supposed that a portion is "connected" to another portion, this includes not only "directly connected" but also "electrically connected" to other elements in between. Furthermore, when a portion "comprises" a component, it will be understood that it may further include another component, without excluding other components unless specifically stated otherwise.

Hereinafter, embodiments of the inventive concept will be described in detail with reference to the accompanying drawings such that those skilled in the art to which the inventive concept pertains may readily carry out the inventive concept. However, the inventive concept may be implemented in various different forms and is not limited to the embodiments described herein. In drawings, components or elements not associated with the detailed description may be omitted to describe the inventive concept clearly, and like reference numerals refer to like elements throughout this application.

FIG. 1 is a block diagram of a fruit identification device, according to an embodiment of the inventive concept.

Referring to FIG. 1, a fruit identification device includes a control unit 101, a memory 103, an image acquisition unit 105, a display unit 107, a communication unit 109, a fruit inserting unit 111, and a fruit sorting unit 113.

Referring to each component, the fruit inserting unit 111 includes a fruit transfer unit 115 and a fruit rotation unit 117.

Figure 3:
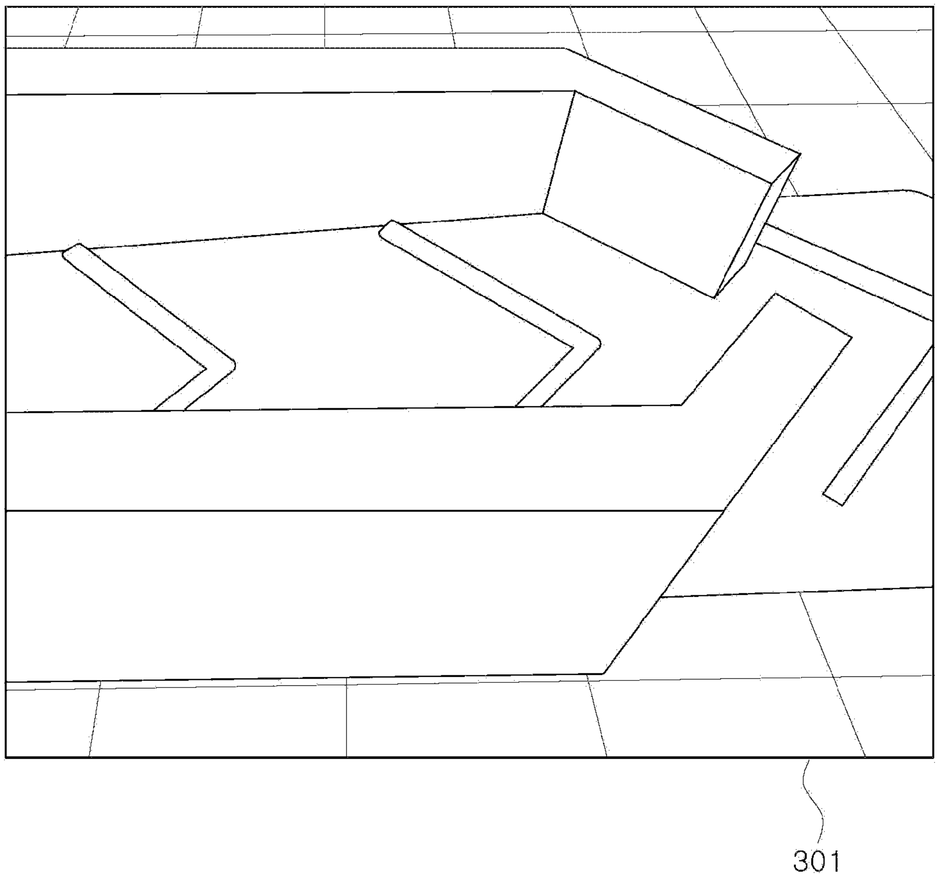
FIG. 3 is a diagram illustrating a fruit transfer unit, according to an embodiment of the inventive concept.

The fruit transfer unit 115 selects one fruit from a plurality of fruits, and transfers the selected fruit to the fruit rotation unit 117 by using a conveyor roller or a conveyor belt. For example, as shown at 301 in FIG. 3, the fruit transfer unit 115 may align a plurality of fruits in a line by using an alignment mechanism and may sequentially deliver the plurality of fruits arranged in a row to the fruit rotation unit 117 by using a conveyor belt.

Figure 4:
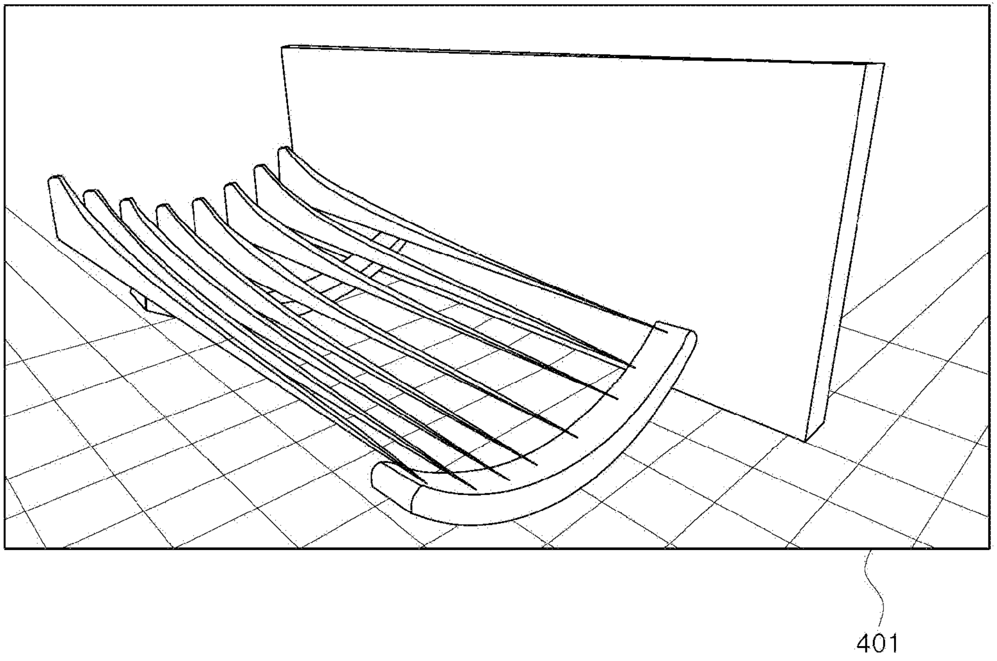
FIG. 4 is a diagram illustrating a fruit rotation unit, according to an embodiment of the inventive concept.

The fruit rotation unit 117 sequentially receives the plurality of fruits from the fruit transfer unit 115, sequentially rotates one of the received fruits, and moves the rotated fruit to the fruit sorting unit 113. For example, as shown in 401 of FIG. 4, the fruit rotation unit 117 may be configured such that the bottom surface is curved, and one side of the bottom surface is more inclined than another side. For example, the fruit rotation unit 117 may rotate a fruit by 360 degrees such that all sides of a fruit are exposed by using an inclined bottom surface, and may deliver the rotated fruit to the fruit sorting unit 113.

The fruit sorting unit 113 sequentially receives a plurality of fruits from the fruit rotation unit 117, and sequentially moves the received fruits to different regions under control of the control unit 101. For example, the different regions may include a defective region for storing defective fruits and a normal region for storing normal fruits. For example, the defective fruits may refer to fruits having defective conditions such as scars, bruises, bruises, and pest infestation on the fruit. For example, the normal fruits may refer to fruits that do not have bad conditions. For example, the normal region may be divided into a plurality of regions depending on the predetermined number of fruit grades. For example, the fruit grade may be determined by a user in consideration of the size of a fruit.

Figure 5:
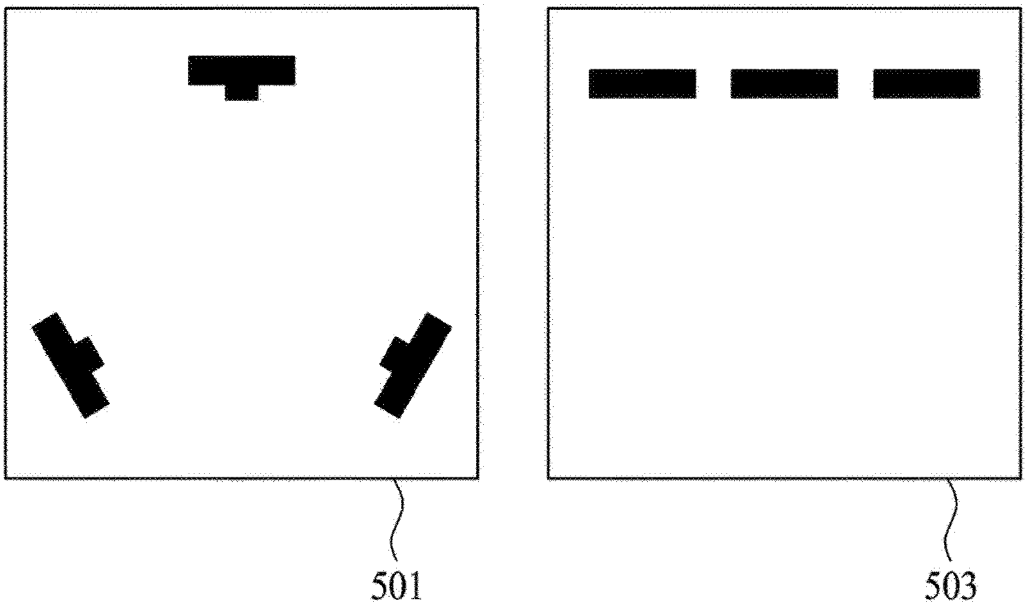
FIG. 5 is a diagram illustrating an image acquisition unit, according to an embodiment of the inventive concept.

The image acquisition unit 105 generates a plurality of image data by capturing all sides of a fruit rotating in the fruit tree rotation unit 117 by using a plurality of cameras, and outputs the generated plurality of image data to the control unit 101. For example, as shown in 501 of FIG. 5, a bird's-eye view of the image acquisition unit 105 may include three cameras. For example, the three cameras may be placed with an interval of 120 degrees, and the three cameras may be focused on the center. For example, as shown in 503 of FIG. 5, in a side view of the image acquisition unit 105, the three cameras may be arranged side by side.

The memory 103 stores various programs and data required for an operation of a fruit identification device. For example, the memory 103 may be implemented as a non-volatile memory, a volatile memory, a flash-memory, a hard disk drive (HDD), or a solid-state drive (SSD).

The display unit 107 displays image data under control of the control unit 101. The implementation method of the display unit 107 is not limited thereto. For example, the display unit 107 may be implemented in various types of displays such as a liquid crystal display (LCD), an organic light emitting diode (OLED) display, an active-matrix organic light emitting diode (AM-OLED) display, a plasma display panel (PDP), or the like. The display unit 107 may additionally include additional configurations depending on the implementation method thereof. For example, when the display unit 107 has a liquid crystal type, the display unit 107 includes an LCD display panel (not shown), a backlight unit (not shown) that supplies light to the LCD display panel, and a panel driving substrate (not shown) that drives the panel (not shown). The display unit 107 may be coupled with a touch panel (not shown) of an input/output unit (not shown) to be provided to a touch screen (not shown).

The communication unit 109 communicates with various types of external devices according to various types of wired or wireless communication methods. For example, the communication unit 109 may transmit identification result data including identification results of a plurality of fruits to a user's portable terminal (not shown). For example, the identification result data may include the number of defective fruits identified by the fruit identification device, a defective state for each defective fruit, the number of normal fruits, and a grade for each normal fruit. For example, the communication unit 109 may include various wireless communication modules such as a Wi-Fi module, an LTE module, a 5G module, a LoRa module, a Bluetooth module, and a Zigbee module. For example, the WiFi module may perform communication by using a Wi-Fi method, and the LTE module may perform communication according to various communication standards such as IEEE and LTE. For example, the communication unit 109 may perform communication according to various communication standards such as LAN, RS-232C, RS-422, RS-485, or a USB port.

The control unit 101 controls overall operations of the fruit identification device by using various programs stored in the memory 103. For example, the control unit 101 may generate pieces of image data of one fruit through the image acquisition unit 105, may determine a grade and bad condition of a fruit by using the generated pieces of image data, and may classify fruits based on the grade and bad condition determined by the fruit sorting unit 113.

Now, the control unit 101 will be described in detail with reference to FIG. 2.

Figure 2:
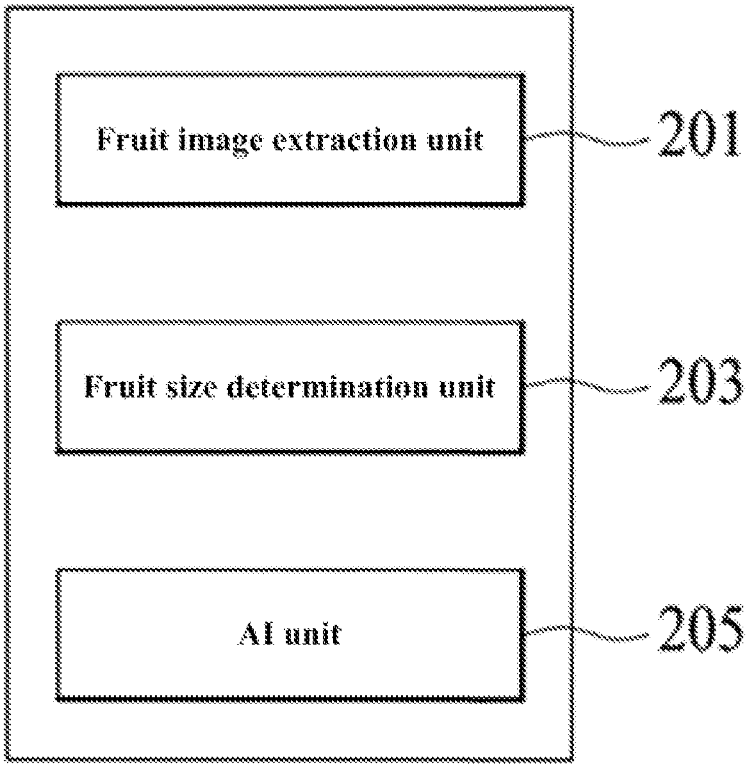
FIG. 2 is a block diagram of a control unit, according to an embodiment of the inventive concept.

FIG. 2 is a block diagram of the control unit 101, according to an embodiment of the inventive concept.

Referring to FIG. 2, the control unit 101 includes a fruit image extraction unit 201, a fruit size determination unit 203, and an artificial intelligence (AI) unit 205.

Referring to each component, the fruit image extraction unit 201 receives pieces of image data corresponding to one fruit from the image acquisition unit 105, extracts only fruits from the pieces of image data through a predetermined image processing technology, and creates pieces of fruit image data. Moreover, the fruit image extraction unit 201 may output the generated pieces of fruit image data to the fruit size determination unit 203. For example, the image processing technique may be a technology of extracting an outline from image data and extracting image data included in the outline when the extracted outline is close to a circular shape. For example, each of the pieces of fruit image data may be image data including only fruits.

The fruit size determination unit 203 determines a fruit size for one fruit by using the pieces of fruit image data, and determines the grade for a fruit by using the determined fruit size and a predetermined grade table for each fruit size. For example, the grade table for each fruit size may be a table indicating grades according to a fruit size. For example, when the fruit is an apple, the grade table for each fruit size may be divided from grade 1 to grade 8 according to the size of the apple.

For example, when a plurality of cameras of the image acquisition unit 105 are stereo cameras, the fruit size determination unit 203 may generate 3D fruit image data by synthesizing the pieces of fruit image data by using a 3D reconstruction method, and may calculate the volume of a fruit by using the generated 3D fruit image data. For example, the stereo camera may be a camera used to capture a stereoscopic picture, and may simultaneously take a picture of a fruit with two lenses of the same type corresponding to left and right eyes. Furthermore, the fruit size determination unit 203 may identify the grade corresponding to the volume of the fruit calculated in the grade table for each fruit size and may determine that the grade of a fruit is the identified grade.

Besides, the fruit size determination unit 203 calculates the weight of a fruit by using pieces of fruit image data and determines the grade for a fruit by using the calculated weight and the predetermined grade table for each fruit weight. For example, the grade table for each fruit weight may be a table indicating a grade according to fruit weight. For example, when the fruit is an apple, the grade table by fruit weight may be divided from grade 1 to grade 8 according to the weight of the apple.

For example, the fruit size determination unit 203 may detect the pre-stored density table for each fruit in the memory 103, may identify the density of the corresponding fruit in the density table for each detected fruit, and may calculate the weight of a fruit by multiplying the identified density by the calculated volume of the fruit. For example, the density table for each fruit may be a table in which densities are recorded for each fruit. Furthermore, the fruit size determination unit 203 may identify the grade corresponding to the weight of the fruit calculated in the grade table for each fruit weight and may determine that the grade of a fruit is the identified grade.

The AI unit 205 receives pieces of image data corresponding to a fruit from the image acquisition unit 105 and determines a plurality of defect feature certainties by analyzing the received pieces of image data. In other words, the AI unit 205 determines the plurality of defect feature certainties corresponding to the pieces of image data. For example, the plurality of defect feature certainties may indicate the probability that pieces of image data are certain to includes at least one of features for a defective state (wounds, bruises, spoilage, and pest infestation of a fruit) of a fruit.

Moreover, the AI unit 205 determines whether one of the determined plurality of defect feature certainties is greater than or equal to a predetermined reference defect feature certainty. For example, the reference defect feature certainty may be 90 percent.

When the determination result indicates that one of the plurality of defect feature certainties is greater than or equal to the reference defect feature certainty, the AI unit 205 determines that the corresponding fruit is in a defective state.

Afterward, the control unit 101 moves the corresponding fruit to a defective region through the fruit sorting unit 113. In this case, the control unit 101 displays the grade of the fruit, a plurality of defect feature certainties, and pieces of fruit image data, on which defect features are projected, through the display unit 107. For example, the pieces of fruit image data onto which defect features are projected may be image data onto which only a defective state is projected.

Meanwhile, when all of the plurality of defect feature certainties are less than the reference defect feature certainty, the AI unit 205 determines that the corresponding fruit is in a normal state.

Afterward, the control unit 101 moves the corresponding fruit to a normal region corresponding to the determined grade through the fruit sorting unit 113. In this case, the control unit 101 displays the grade of the corresponding fruit and a plurality of defect feature certainties through the display unit 107.

Moreover, the control unit 101 generates identification result data for a plurality of fruits and transmits the identification result data generated through the communication unit 109 to a mobile terminal of a user.

In an embodiment of the inventive concept, fruits may be identified through this configuration while manpower and cost are minimized. Moreover, fruits may be identified while accuracy and consistency are maintained.

The AI unit according to an embodiment of the inventive concept employs a deep learning algorithm. For example, the deep learning algorithms may include autoencoders, convolutional neural networks (CNN), recurrent neural networks (RNN), generative adversarial networks (GAN), and the like. However, the deep learning algorithms listed in the inventive concept are only examples, and are not limited thereto.

In the inventive concept, the CNN, which is one of the deep learning algorithms listed above, is applied, but is not limited thereto. That is, in the inventive concept, various types of deep learning algorithms may be used according to the user's selection.

Figure 6:
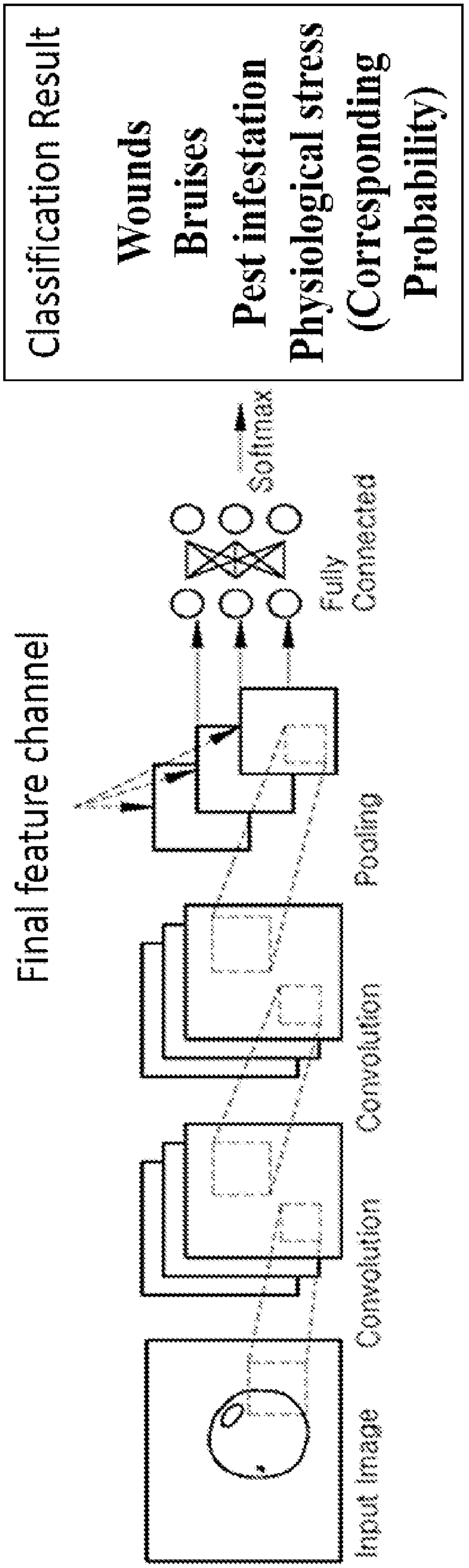
FIG. 6 is a diagram illustrating a procedure for determining a plurality of defect feature certainties by an AI unit, according to an embodiment of the inventive concept.

FIG. 6 is a diagram illustrating a procedure for determining a plurality of defect feature certainties by the AI unit 205, according to an embodiment of the inventive concept.

Figure 7:
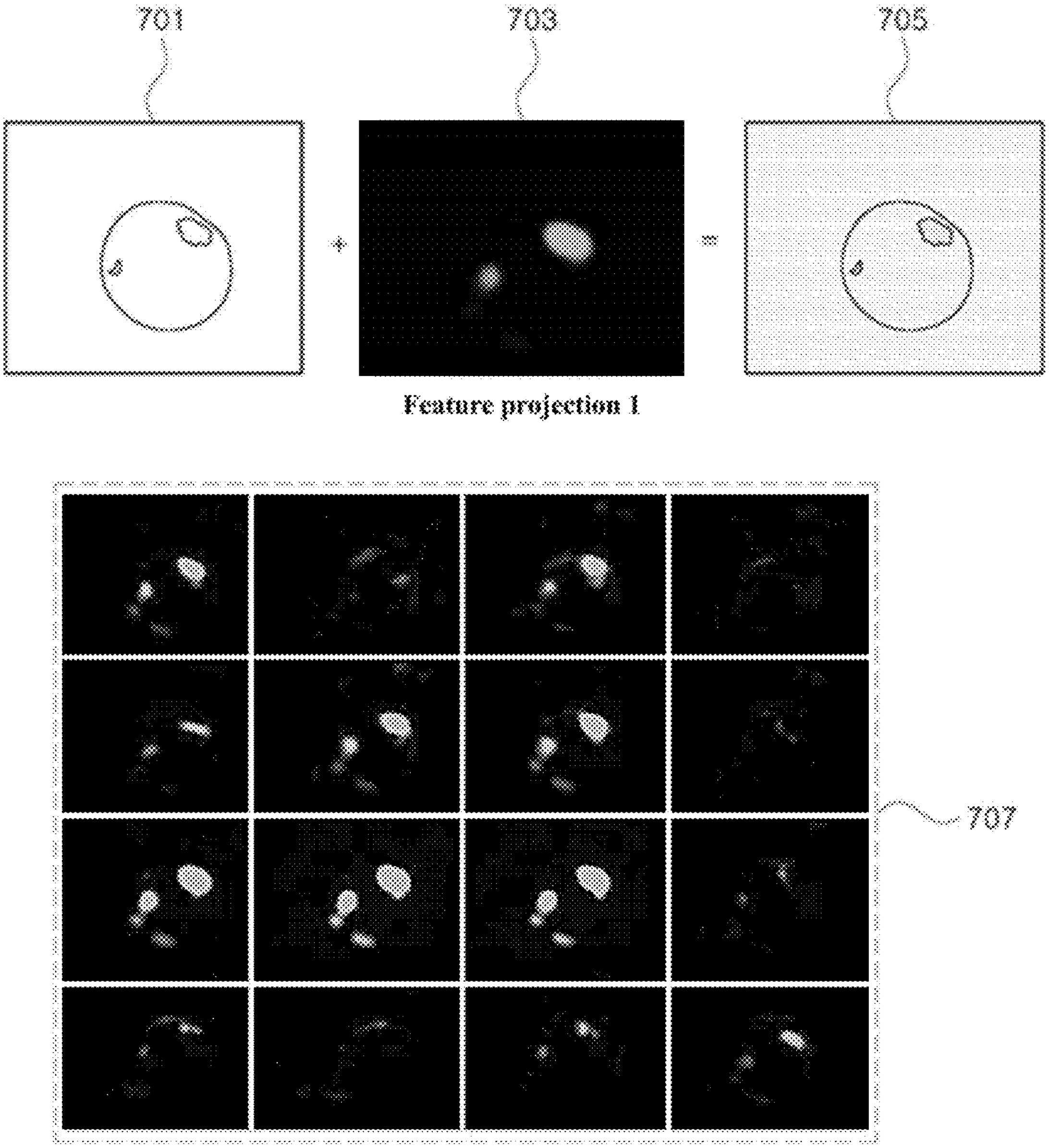
FIG. 7 is a diagram illustrating a procedure for determining a defect feature certainty for a defective fruit by an AI unit, according to an embodiment of the inventive concept.

FIG. 7 is a diagram illustrating a procedure for determining a defect feature certainty for a defective fruit by the AI unit 205, according to an embodiment of the inventive concept.

Referring to FIG. 7, the AI unit 205 generates a final feature channel (see FIG. 6) by processing one image data 701 among pieces of image data. For example, among 256 channels of the final feature channel, 16 channels may be activated as illustrated in screen 707.

Moreover, the AI unit 205 generates a defect feature projection 703 by multiplying the final feature channel by a weight of a fully-connect-layer for each channel. Furthermore, the AI unit 205 generates fruit image data 705, onto which defect features are projected, by synthesizing the corresponding image data 701 and the defect feature projection 703.

Besides, the AI unit 205 determines a feature average value by dividing the sum of all G channel values among RGB channel values for each pixel of an image of the defect feature projection 703 by the total number of pixels, and determines a defect feature certainty by applying Softmax to the determined feature average value.

For example, Softmax may be expressed based on Equation 1 below.

$$S(y_i) = \frac{e^{y_i}}{\sum_{j=1}^{n} e^{y_i}} \quad \text{[Equation 1]}$$

For example, 'n' may denote the total number of projections, and 'i' may indicate the unique number of a projection. Moreover, '$y_i$' may denote a feature average value of each projection, and 'e' may denote a natural constant.

For example, when the image data 701 includes a rotten part, the defect feature certainty may be determined to be 99.9%, and a normal feature certainty may be determined to be 0%.

Figure 8:
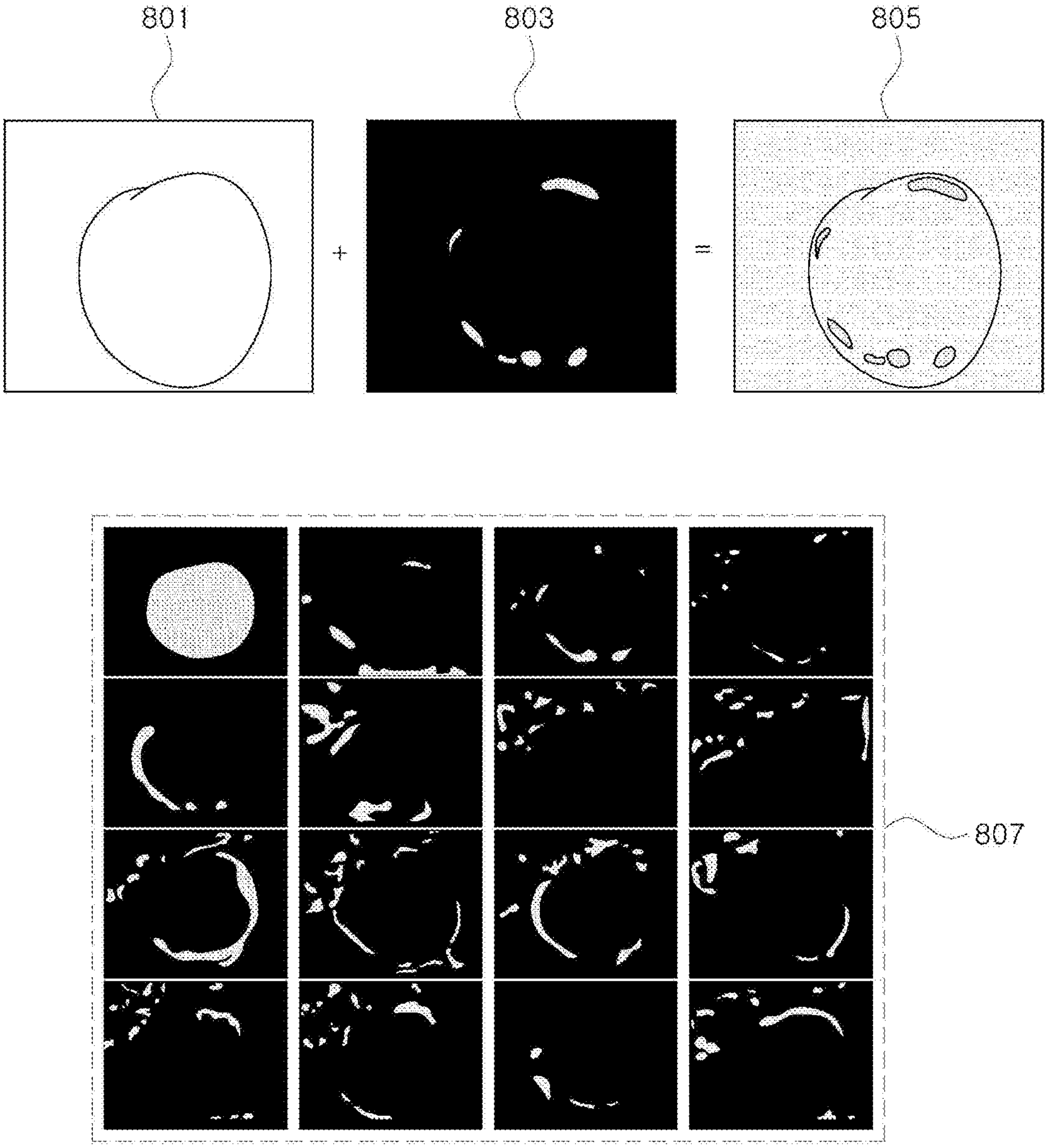
FIG. 8 is a diagram illustrating a procedure for determining a defect feature certainty for a normal fruit by an AI unit, according to an embodiment of the inventive concept.

FIG. 8 is a diagram illustrating a procedure for determining a defect feature certainty for a normal fruit by the AI unit 205, according to an embodiment of the inventive concept.

Referring to FIG. 8, the AI unit 205 generates a final feature channel by processing one image data 801 among pieces of image data. For example, among 256 channels of the final feature channel, 16 channels may be activated as illustrated in screen 807.

Moreover, the AI unit 205 generates a defect feature projection 803 by multiplying the final feature channel by a weight of a fully-connect-layer for each channel. Furthermore, the AI unit 205 generates fruit image data 805, onto which defect features are projected, by synthesizing the corresponding image data 801 and the defect feature projection 803.

Besides, the AI unit 205 determines a feature average value by dividing the sum of all G channel values among RGB channel values for each pixel of an image of the defect feature projection 803 by the total number of pixels, and determines a defect feature certainty by applying Softmax to the determined feature average value. For example, when the image data 801 corresponds to a normal state, the defect feature certainty may be determined to be 1%, and a normal feature certainty may be determined to be 99%.

Figure 9:
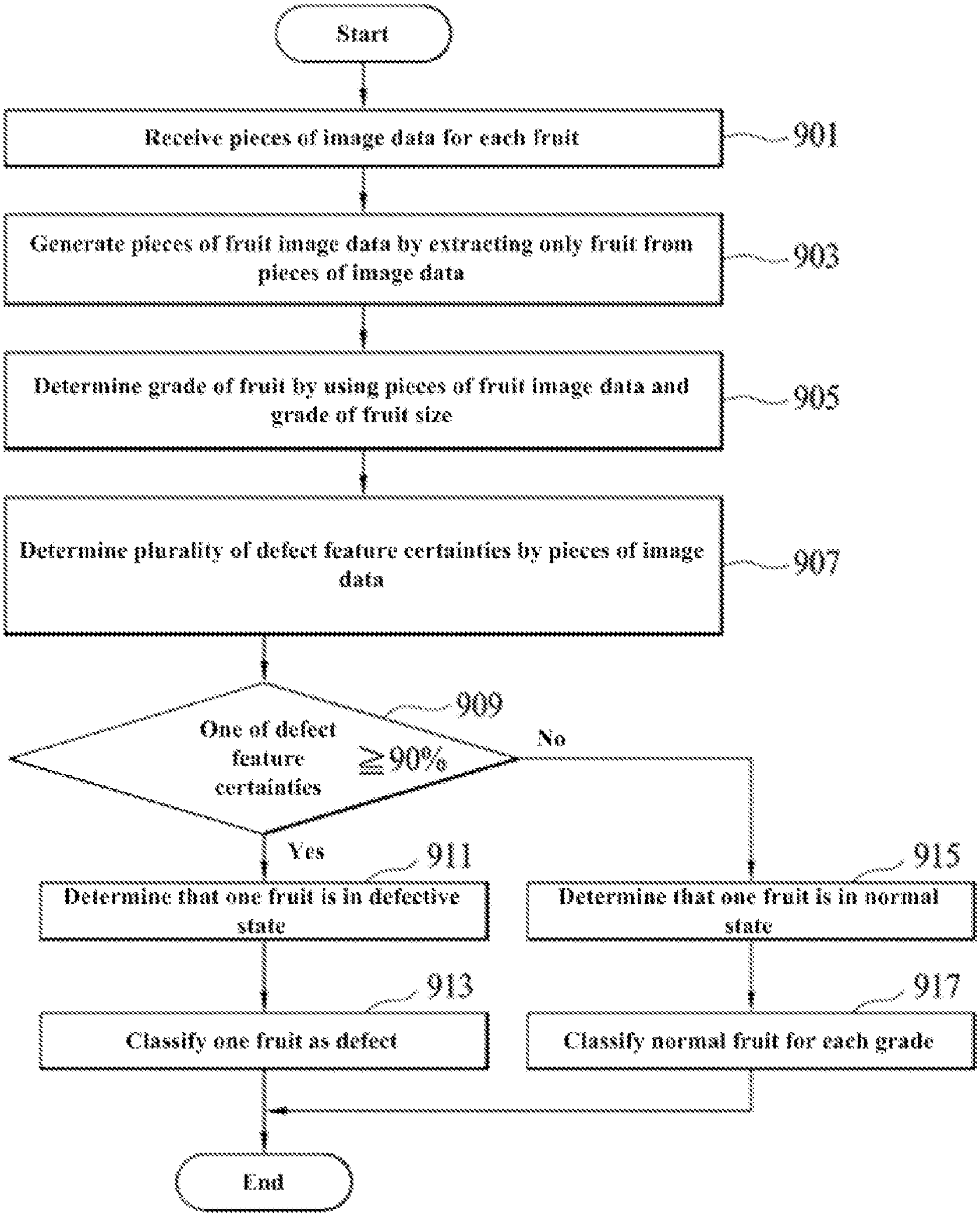
FIG. 9 is a flowchart for identifying a fruit by a fruit identification device, according to an embodiment of the inventive concept.

FIG. 9 is a flowchart for identifying a fruit by a fruit identification device, according to an embodiment of the inventive concept.

Referring to FIG. 9, in operation 901, the control unit 101 of a fruit identification device receives pieces of image data for each fruit from the image acquisition unit 105. For example, each of the pieces of image data may include the shape of one fruit.

In operation 903, the control unit 101 generates pieces of fruit image data by extracting only the fruit from the pieces of image data through a predetermined image processing technology. Moreover, the fruit image extraction unit 201 may output the generated pieces of fruit image data to the fruit size determination unit 203.

In operation 905, the control unit 101 determines a fruit size for one fruit by using the pieces of fruit image data, and determines the grade for a fruit by using the determined fruit size and a predetermined grade table for each fruit size.

For example, when a plurality of cameras of the image acquisition unit 105 are stereo cameras, the control unit 101 may generate 3D fruit image data by synthesizing the pieces of fruit image data by using a 3D reconstruction method, and may calculate the volume of a fruit by using the generated 3D fruit image data. Moreover, the control unit 101 may identify the grade corresponding to the volume of the fruit calculated in the grade table for each fruit size and may determine that the grade of a fruit is the identified grade.

For example, the control unit 101 may detect the pre-stored density table for each fruit in the memory 103, may identify the density of the corresponding fruit in the density table for each detected fruit, and may calculate the weight of a fruit by multiplying the identified density by the calculated volume of the fruit. Furthermore, the control unit 101 may identify the grade corresponding to the weight of the fruit calculated in the grade table for each fruit weight and may determine that the grade of a fruit is the identified grade.

In operation 907, the control unit 101 determines a plurality of defect feature certainties by analyzing the pieces of image data for a fruit. In other words, the control unit 101 determines the plurality of defect feature certainties corresponding to the pieces of image data.

In operation 909, the control unit 101 determines whether one of the determined plurality of defect feature certainties is greater than or equal to a predetermined reference defect feature certainty. For example, the reference defect feature certainty may be 90 percent.

When the determination result indicates that one of the plurality of defect feature certainties is greater than or equal to the reference defect feature certainty, the control unit 101 proceeds to operation 911. Meanwhile, when all of the plurality of defect feature certainties are less than the reference defect feature certainty, the control unit 101 proceeds to operation 915.

In operation 911, the control unit 101 determines that the corresponding fruit is in a defective state. In operation 913, the control unit 101 moves the corresponding fruit to a defective region through the fruit sorting unit 113. In this case, the control unit 101 displays the grade of the fruit, a plurality of defect feature certainties, and pieces of fruit image data, on which defect features are projected, through the display unit 107.

In operation 915, the control unit 101 determines that the corresponding fruit is in a normal state. In operation 917, the control unit 101 moves the corresponding fruit to a normal region corresponding to the determined grade through the fruit sorting unit 113. In this case, the control unit 101 displays the grade of the corresponding fruit and a plurality of defect feature certainties through the display unit 107.

Afterward, the control unit 101 generates identification result data for a plurality of fruits and transmits the identification result data generated through the communication unit 109 to a mobile terminal of a user.

In an embodiment of the inventive concept, fruits may be identified through the operations while manpower and cost are minimized. Moreover, fruits may be identified while accuracy and consistency are maintained.

Above, although preferred embodiments of the inventive concept have been shown and described, the inventive concept is not limited to the specific embodiments described above. Various modifications may be made by those skilled in the art to which the inventive concept belongs without departing from the gist of the inventive concept claimed in the claims, and these modified implementations should not be individually understood from the technical spirit or perspective of the inventive concept. For example, in an embodiment of the inventive concept, it has been described as identifying a fruit, but is not limited thereto. For example, in an embodiment of the inventive concept, not only fruits but also agricultural and forestry products may be identified.

In an embodiment of the inventive concept, fruits may be identified while manpower and cost are minimized.

Moreover, fruits may be identified while accuracy and consistency are maintained.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A fruit identification device comprising:

a fruit inserting unit configured to align a plurality of fruits in a row and to rotate the aligned fruits;

a fruit sorting unit configured to sequentially classify the aligned fruits under control of a control unit;

an image acquisition unit configured to generate pieces of image data for one fruit by sequentially capturing the rotated fruits; and wherein the control unit configured to:

generate pieces of fruit image data by extracting only a fruit from the pieces of image data;

segment each piece of fruit image data into a plurality of localized image fragments corresponding to different surface regions of the fruit;

determine, using an artificial-intelligence model, a defect probability value for each of the localized image fragments;

aggregate the defect probability values of the localized image fragments to generate a plurality of defect feature certainties for the fruit;

compare the defect feature certainties with a predetermined reference defect feature certainty;

determine that the fruit is in a defective state or a normal state based on the comparison result;

determine a weight of the fruit by using the pieces of fruit image data;

determine a grade of the fruit by using the weight of the fruit;

when the fruit is in the defective state, move the fruit to a defective region through the fruit sorting unit, and generate a visual projection of defect regions onto the localized image fragments for display; and when the fruit is in the normal state, move the fruit to a normal region corresponding to the grade of the fruit among a plurality of normal regions through the fruit sorting unit.

2. The fruit identification device of claim 1, wherein the control unit is configured to:

when at least one of the defect feature certainties is greater than or equal to the reference defect feature certainty, determine that the fruit is in the defective state; and when all of the defect feature certainties are less than the reference defect feature certainty, determine that the fruit is in the normal state.

3. The fruit identification device of claim 1, wherein the defective state includes at least one of a wound, a bruise, a spoilage, or pest infestation of a fruit.

4. The fruit identification device of claim 1, further comprising:

a display unit, wherein the control unit is configured to:

when the fruit is in the defective state, display the grade of the fruit, the defect feature certainties, and the pieces of fruit image data, onto which a defect feature is projected, through the display unit; and when the fruit is in the normal state, display the grade of the fruit and the defect feature certainties through the display unit.

5. The fruit identification device of claim 1, further comprising:

a communication unit, wherein the control unit is configured to:

generate identification result data for the fruits; and transmit the identification result data to a mobile terminal of a user through the communication unit.

6. A method for identifying a fruit, the method comprising:

aligning, by a control unit, a plurality of fruits in a row and rotating the aligned fruits, through a fruit inserting unit;

generating, by the control unit, pieces of image data for one fruit by sequentially capturing the rotated fruits through an image acquisition unit;

generating, by the control unit, pieces of fruit image data by extracting only a fruit from the pieces of image data;

segmenting, by the control unit, each piece of fruit image data into a plurality of localized image fragments corresponding to different surface regions of the fruit;

determining, by the control unit and using an artificial-intelligence model, a defect probability value for each of the localized image fragments;

aggregate, by the control unit, the defect probability values of the localized image fragments to generate a plurality of defect feature certainties for the fruit;

compare, by the control unit, the defect feature certainties with a predetermined reference defect feature certainty;

determine, by the control unit, that the fruit is in a defective state or a normal state based on the comparison result;

determining, by the control unit, a weight of the fruit by using the pieces of fruit image data and determining a grade of the fruit by using the weight of the fruit;

when the fruit is in the defective state, moving, by the control unit, the fruit to a defective region, and generating a visual projection of defect regions onto the localized image fragments for display; and when the fruit is in the normal state, moving, by the control unit, the fruit to a normal region corresponding to the grade of the fruit among a plurality of normal regions.

7. The method of claim 6, wherein the determining that the fruit is in the defective state or the normal state includes:

when at least one of the defect feature certainties is greater than or equal to the reference defect feature certainty, determining that the fruit is in the defective state; and when all of the defect feature certainties are less than the reference defect feature certainty, determining that the fruit is in the normal state.

8. The method of claim 6, wherein the defective state includes at least one of a wound, a bruise, a spoilage, or pest infestation of a fruit.

9. The method of claim 6, further comprising:

generating, by the control unit, identification result data for the fruits; and transmitting, by the control unit, the identification result data to a mobile terminal of a user through a communication unit.

10. The fruit identification device of claim 1, wherein the artificial-intelligence model comprises a convolutional neural network including a plurality of convolution layers, pooling layers, and fully connected layers configured to output the defect probability values for the localized image fragments.

11. The fruit identification device of claim 1, wherein determining that the fruit is in the defective state comprises determining that at least one of the defect feature certainties is equal to or greater than 90 percent (90%).

12. The fruit identification device of claim 1, wherein the control unit is further configured to generate a visual projection of defect regions onto corresponding localized image fragments for display.

* * * * *